April 26, 1938.                 E. HOCKE ET AL                    2,115,525
    DIESEL TYPE LOCOMOTIVE WITH DIRECT TRANSMISSION AND WITH AUTOMATICALLY
            SUPERCHARGED MOTOR WHEN DECREASING THE VELOCITY
                        Filed July 24, 1935              2 Sheets-Sheet 1

Fig. 1.

INVENTORS
ENRICO HOCKE
FAUSTO ZARLATTI
BY Haseltine, Lake & Co.
ATTORNEYS

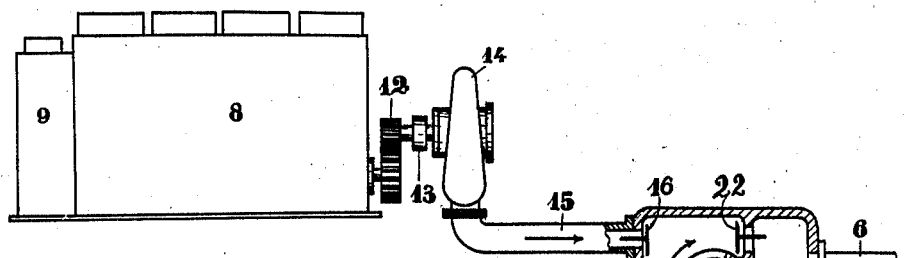
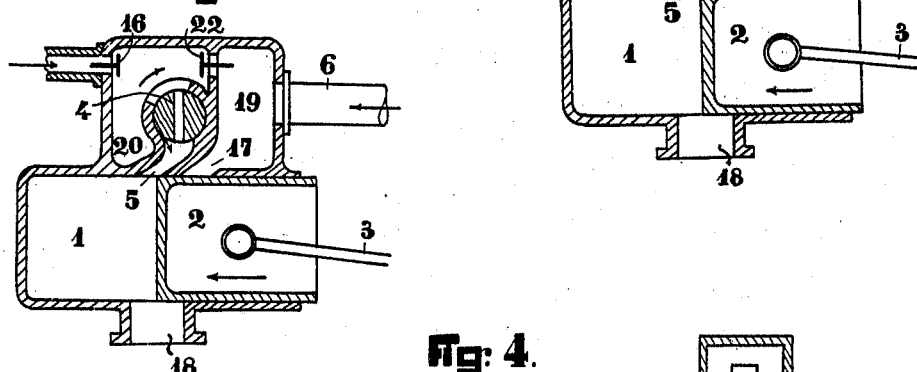
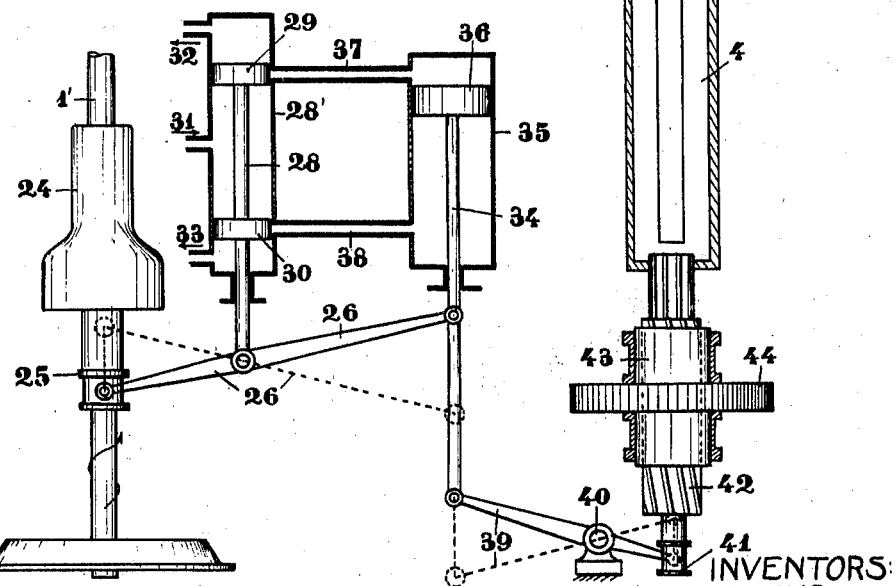

Patented Apr. 26, 1938

2,115,525

UNITED STATES PATENT OFFICE 2,115,525

DIESEL TYPE LOCOMOTIVE WITH DIRECT TRANSMISSION AND WITH AUTOMATICALLY SUPERCHARGED MOTOR WHEN DECREASING THE VELOCITY

Enrico Hocke, Genoa, and Fausto Zarlatti, Rome, Italy

Application July 24, 1935, Serial No. 32,822
In Italy July 26, 1934

4 Claims. (Cl. 105—62)

It is known that in the locomotives of the Diesel type, in which the combustion motors transmit the power directly to the driving axles, it is necessary to maintain constant the motive power, even when the velocity decreases as much as to one third and even one fourth of the normal speed of the locomotive.

The present invention has for its object a device making it possible to ensure the automatic supercharging of the motors of a Diesel locomotive of the type above mentioned, so as to maintain practically unaltered its total power, even when the velocity has been reduced to such a point that the number of revolutions of the wheels is brought down to a quarter of that when running normally. This object is attained, with the present invention, by supercharging the Diesel motor with additional air conveyed thereto in increasing quantities as the speed of the motor is decreased, so that the quantity of supercharging air admitted for each stroke of the piston in the cylinder is increasingly greater, the greater the reduction of the velocity, conversely said additional air being reduced to nought when the speed of the locomotive has reached a certain normal value, beyond which, if the velocity of the locomotive should increase still further, said supercharging air will no longer operate in conjunction with the fuel but operates simply as scavenging air in the cylinder, reaching this latter during the opening of the exhaust ports.

The invention also comprises the use, as compressed air motors, of the pumps providing scavenging air to the motor, and this not only during the short time when the motor is being started, as already known, but also during the normal running of the locomotive, as subsidiary motors to the main Diesel motor when these latter are supercharged during the periods of low velocities as already mentioned.

By thus operating in said last periods, the air discharged from the pumps acting as motors, and subsequently serving as scavenging air, arrives at the Diesel motor in a greatly cooled condition and produces therein a strong and efficient refrigeration which is added to that obtained from the water circulation. With this, a strong and efficient cooling of the motor is rendered possible also during the periods in which the motor is overloaded in which the cooling with water circulation only, would prove insufficient.

The device for obtaining the automatic variable supercharging in the manner above described, is operated by the axles of the locomotive through a centrifugal regulator controlling the position of an adjustable valve distributor. In direct relation to the position of this valve and to the velocity of the locomotive, the air distributed by the said distributor or valve, enters into the cylinder supercharging it when the velocity of the locomotive is reduced, thus giving rise to the production of greater power in said cylinder, in relation to the greater quantity of air introduced; and when the velocity of the locomotive increases, the position of said distributor is automatically displaced by means of the centrifugal regulator above mentioned, up to such a point at which the supercharging ceases, the air delivered by the distributor or valve then operating only as scavenging air in the cylinder, when a certain given velocity has been reached and passed.

The regulation of the delivery of fuel to the motor may also be obtained automatically by said centrifugal air admission regulator above described.

The device for obtaining in practice the objects mentioned above, may have various different shapes; a convenient form of the invention is illustrated by way of example in the annexed drawings, in which:

Fig. 1 shows schematically in side elevation the general lay out of a locomotive provided with the device according to the invention.

Fig. 2 shows a longitudinal section through a cylinder of the internal combustion motor, and its connections with the overloading air blower, the air distributing valve, which in the form of construction shown in Fig. 1 is a rotary distributing valve, this valve being shown in correspondence with the low speed of the locomotive.

Fig. 3 shows the longitudinal section of the motor cylinder and the rotary distributing valve in correspondence with the high speed of the locomotive.

Fig. 4 shows in plan view how the distributing valve is operably connected to an axle of the locomotive.

In all the figures the same reference numerals indicate corresponding parts.

In Fig. 1, 1 is the cylinder of an internal combustion motor operating on the Diesel's two stroke cycle, the piston 2 of which is connected to the driving wheel axles of the locomotive by means of a connecting rod 3. 4 is an air distributor, which, in the example illustrated, consists of a rotary valve having the form of a cock valve controlling the inlet ports 5 of the cylinder 1 (Figs. 2 and 3). 6 is a tube conveying to the motor, through the ports 17, the scavening air delivered from the piston pumps 7 (Fig. 1) driven from the wheels of the locomotive, and connected to the latter in the same way as used in steam locomotive cylinders. 8 is an auxiliary Diesel motor, independent from the locomotive wheels, driving a compressor 9 which compresses the air into the storage vessel 10. From this storage vessel the compressed air may be delivered to the pumps 7, when these operate as compressed air motors for starting the locomotive, through the tube 11, both when running forward and when running backward. The inlet opening of this tube may however be closed by means of a regulator 21, in which case, when the locomotive is running normally, the wheels driving the pumps, these draw air from outside through a valve 23, opening inwards and mounted on the tube 11, or in any other convenient position. In either case, the air delivered by the pumps, after having been compressed therein, (if drawn from the outside), and after having expanded, (if coming from the storage tank 10), arrives, through the tube 6, to the Diesel motor 1 to be used therein in the way hereinafter described.

In addition to the compressor 9, the auxiliary motor 8 drives, through suitable step-up gearings 12, comprising a friction clutch 13, Fig. 2, a turbo-blower 14 which supplies air to the motor cylinder 1, through the tube 15, provided with a retaining valve 16 (Figs. 2 and 3).

Figures 2 and 3 show in section and on an enlarged scale the cylinder 1 and the piston 2 of the two cycle motor, and also the distributor, which in the drawings is shown as a rotary valve 4, controlling the air inlet ports of the motor, respectively in the positions of low and high rate of velocity of the locomotive. 17 and 5 are respectively the scavening port and the inlet port for the air, while 18 indicates the exhaust port of the motor. The rotary valve 4 controls the inlet ports 5, and is operably connected to a rotary regulator 24 mounted on an axle of the locomotive as shown in Fig. 4 and driven by the driving wheels of the locomotive.

The air from the pumps 7 delivered through the tube 6, is discharged into the chamber 19, and when the piston 2 opens the ports 17, it passes into the cylinder of the motor 1 for scavenging.

The filling air fed to the cylinder of the motor 1 from the turbo-blower 14, passes to chamber 20 (Figs. 2 and 3) through the one way valve 16, and is distributed to the cylinder of the motor 1 by the rotary valve 4. The inlet ports 5 are closed by the piston 2 after this latter has closed the discharge ports 18.

The device above described operates as follows:
The auxiliary Diesel motor 8 is started by means of an electric motor or like starting device, and the compressed air supplied by the compressor 9, driven by the said motor 8, is delivered to the scavenging pumps 7 through the storage tank 10 and the tube 11 by opening the regulator 21 which provides a communication between the said storage tank and the scavenging pumps 7. These latter, which in these conditions operate as compressed air motors, as they are connected to the wheels of the locomotive, start its movement, thereby the cylinder or cylinders 1 commence to operate, receiving the exhaust air from pumps 7.

When the principal motor 1 has been started and the locomotive has attained its normal running speed, the entrance of the compressed air leading to the pumps 7 is closed by operating the regulator 21; these pumps thereby ceasing to operate as compressed air motors, but, by drawing air through valve 23, they commence again to work normally as scavenging air pumps driven from the wheels of the locomotive.

The above described double operation of the said piston scavenging pumps which, being coupled to the wheels of the locomotive can serve to start its movement, is already known but the use of scavenging pumps as motors, has so far been limited to short periods of time only, corresponding to those required for starting the locomotive.

According to the present invention, by proportioning suitably the auxiliary motor 8, the compressor 9 and the storage vessel 10, the pumps 7 may be caused to operate as auxiliary motors working continuously, also at such times, as during the traversing of up gradients, in which the principal motor 1 must be overfed. In fact, during these periods it is sufficient to open the regulator 21, and thus cause the pumps to operate as when starting, in the manner above described. The motor 1 is thus relieved of the load performed by the pumps 7, which consequently operate as propelling means for utilization of the power of the auxiliary motor 8, said utilization being resorted to, together with the superfeeding of the principal motor when this latter operates at low rates of velocities, in order to restore the normal power of the locomotive.

When the number of revolutions of the locomotive wheels is low, say, down to 100 R. P. M., the rotary valve 4 distributing the air from the turbo-blower 14, opens the inlet port 5 at the same moment in which piston 2 closes the exhaust ports 18 (Fig. 2). Thus the air in the chamber 20 being at a pressure higher than that obtaining in the cylinder, enters into this latter superfeeding it. The motor may thus develop a higher power by burning correspondingly more fuel in proportion to the higher quantity of air introduced in it. When the wheels are running at about 200 R. P. M., the rotary valve 4 is advanced in the direction of the rotation by means of the centrifugal regulator, moved by the wheels of the locomotive, hereinafter described so that when the driving piston 2 closes the exhaust ports 18, valve 4 closes also the inlet ports 5 (Fig. 3). Under these conditions no air supercharging can take place in cylinder 1, because while valve 4 opens ports 5, the driving piston 2 has not closed the exhaust ports 18. The filling air thus operates as scavenging air.

Fig. 4 is a schematic view of the automatic controlled connection of the distributor valve 4 with an axle of the locomotive and the advancement of this valve in relation with the speed of the locomotive. In this figure, 24 indicates a suitable centrifugal regulator connected with one of the axles of the locomotive, adapted to cause the bush 25 to slide up and down. The bush 25 carries a pivot on which is mounted an end of a lever 26. This pivot is mounted at the end of a regulating valve rod 28 running in an oil cylinder 28' and provided with two pistons 29 and 30. Oil under pressure is conveyed to this cylinder by an oil pump, driven also from an axle of the locomotive, through the tube 31, the oil being discharged from said cylinder through the tubes 32 and 33 provided near the ends of the cylinder 28'.

The other end of lever 26 is pivoted to the piston rod 34 of a cylinder or servomotor 35 provided with a piston 36, said piston being moved by the oil pressure applied to one or the other of its faces by the oil conveyed thereto through the oil pressure tubes 37 and 38 delivering the oil from the regulating valve 28'.

The end of the piston rod 34 is pivoted to a lever 39 pivoted at 40, the other arm of lever 39 being pivoted in its turn to a bush mounted on the axle rod of the air distributor 4. One portion of this axle rod is provided with a long threaded screw 42, engaging in a fixed screw nut 43 provided in the hub of a gear wheel 44. It is clear from the above that to any axial movement of the axle rod of the air distributor 4, there will be a corresponding angular displacement thereof.

The position of the devices above described shown in full lines corresponds to the low velocity of the locomotive, comprised between 0 and 80 R. P. M., and that which the levers 26 and 39 shown in dotted lines, (extreme position) corresponds to 200 R. P. M. Beyond this speed the angular position of distributing valve 4 will remain in the position last mentioned and the air passing through it will operate only as scavenging air as above described.

Consequently, for any number of revolutions per minute comprised between 80 and 200, there will be a corresponding position of the air valve 4 determining the quantity of supercharging air admitted to the combustion cylinder of the motor 1 of the locomotive, so that at a low rate of speed (up to about 100 R. P. M.) valve 4 is disposed, relatively to piston 2, in the position shown in Fig. 2, while at a rate of about 200 R. P. M., the centrifugal regulator will have advanced the valve as shown in Fig. 3. In the intermediate velocities, viz. between 100 and 200 R. P. M., all the intermediate positions will be realized, and to each given number of revolutions of the wheels, there will be a corresponding degree of filling, with a maximum at 100 revolutions and a minimum at 200 revolutions and more per minute. When the quantity of filling air decreases, the mean pressure in the motor cylinder will also decrease, while the total work will remain nearly constant, as by decreasing the degree of air filling, the number of revolutions of the wheels increases.

With a higher number of revolutions, say from about 200 to a maximum that may reach 350 R. P. M. the turbo-blower 14 may be cut off by means of the friction clutch 13. In this case the scavenging air supplied by the pumps 7, passes from the chamber 19 to the chamber 20 through the retaining valve 22 provided in the wall separating these two chambers, and from chamber 20 passes, through valve 4, to conduit 5, (Figs. 2 and 3) both conduits 17 and 5 working consequently as scavenging conduits. The by-passing of turbo-blower 14 can be effected automatically by the same centrifugal regulator, when the rate of speed has reached about 200 R. P. M. by any means known in the art.

It is necessary that, when the locomotive wheels are running at about 200 R. P. M. and over, the air supplied by the scavenging pumps, should be passed through both conduits 17 and 5, because with the increase of the number of revolutions, the time for opening the conduits decreases, while the quantity of air supplied at each revolution of the pumps remains the same, so that if the passage of the air should only be limited to conduit 17, the pressure of the scavenging air would increase too much, thereby producing a considerable back pressure in the scavenging pumps when the air is subjected to high velocities. At low speeds on the contrary, the conduit 17 is sufficient for the passage of the air and consequently conduit 5 may be used for the filling air.

Valve 16 is a one way valve the object of which is that of preventing the scavenging air from chamber 20, from passing into the tube 15 when the turbo-blower is stopped.

At high velocities the friction clutch 13 is disconnected, so that in this case, valve 4 admits only air from line 6 through the automatic valve 22 and the chamber 20. Valve 22, which provides a communication between chambers 19 and 20 remains closed only when the air in chamber 20 operates as supercharging air owing to the higher pressure obtaining in this last chamber in relation to the pressure in chamber 19. At high velocities, both the air from line 6 and the air from line 15 have the same pressure, and if the air from this last line should fail (by disconnecting clutch 13) the air from line 6 would operate the scavenging of both valve openings 17 and 5, the air reaching this last opening through valve 22. The valve 16 is provided for preventing the air from passing into the ventilator 14 when this latter is not working. Consequently, the operation of the ventilator 14 has no importance relatively to the scavenging when the machine runs at high velocities, as the scavenging air in this case is supplied through line 6, as above explained.

It will thus be readily understood that valve opening 5 acts as a supercharging opening at low speeds, and as a superscavenging opening at high speeds, providing a complete and thorough scavenging in the cylinder.

The dimensions of the turbo-blower may be limited, because the quantity of air that must be supplied by it is only about one quarter of the quantity of air supplied by the scavenging pumps.

Lastly, mention may be made regarding some of the advantages obtained by operating the scavenging pumps as compressed air motors thereby assisting the work of the principal motor as hereinbefore described.

By operating these pumps 7 as compressed air motors, more particularly when the locomotive is running overloaded, it happens that the air exhaust from these pumps attains very low temperatures, owing to the sudden expansion of said air exhaust, and by using this very cold air for scavenging the Diesel motor, the efficient cooling of this latter is obtained, in addition to the cooling with water already used. The cooling of the Diesel motor, beyond the limits permitted by water cooling, thus obtained specially during the superfeeding stages, to which corresponds an increase of the mean temperature of the Diesel motor, assists in preserving the motor, allowing it a longer period of life.

The compressed air introduced in the scavenging pumps, may also be supplied from compressed air cylinders, charged in any known suitable manner.

We declare that what we claim is:

1. In a direct transmission Diesel type locomotive, the combination, with running gear including a driving axle, a motor provided with a cylinder, a reciprocable piston in said cylinder, said cylinder being adapted to receive fuel and air, of means including coupling rods directly connecting the piston with said driving axle, supercharging means admitting additional air into the cylinder in order to supercharge the motor, automatically operated speed responsive control means controlling said supercharging means so as to cause the maximum amount of the additional air to be admitted to the cylinder during the filling stage at low speed of the locomotive and progressively diminished amounts of air to be admitted at increasing speeds of said locomotive, and an automatic valve operating at a predetermined degree of diminution of said additional air to pass additional air to the motor in the exhaust stage thereof in order to serve as scavenging air.

2. Diesel type locomotive according to claim 1, characterized in that the ports serving to introduce in the cylinder of the motor the additional air for supercharging it when the velocity is low, serve also as ports for the scavenging air in addition to those already existing, when the motor operates under high velocity conditions.

3. Diesel type locomotive according to claim 1, in which the admission of the air, operating only as scavenging air when the motor is under high velocity conditions, is controlled by a distributing valve connected to a centrifugal regulator connected to and driven from the locomotive axles.

4. Diesel type locomotive according to claim 1, including an air compressor characterized in that it is provided with an additional Diesel motor driving the air compressor, said additional motor and said compressor being proportioned so as to allow that the scavenging pumps connected to the wheels of the locomotive, may operate as auxiliary compressed air motors continuously, feeding them with the compressed air delivered by said additional Diesel motor, the air expanded and consequently cooled obtained at the exhaust ports of said motor pumps, being delivered to the cylinder for the efficient cooling thereof, as well as the admission into the said cylinder of a greater mass of air due to its low temperature.

FAUSTO ZARLATTI.
ENRICO HOCKE.